J. B. SKINNER.
Wheel Plow.
No. 54,029. Patented Apr. 17, 1866.
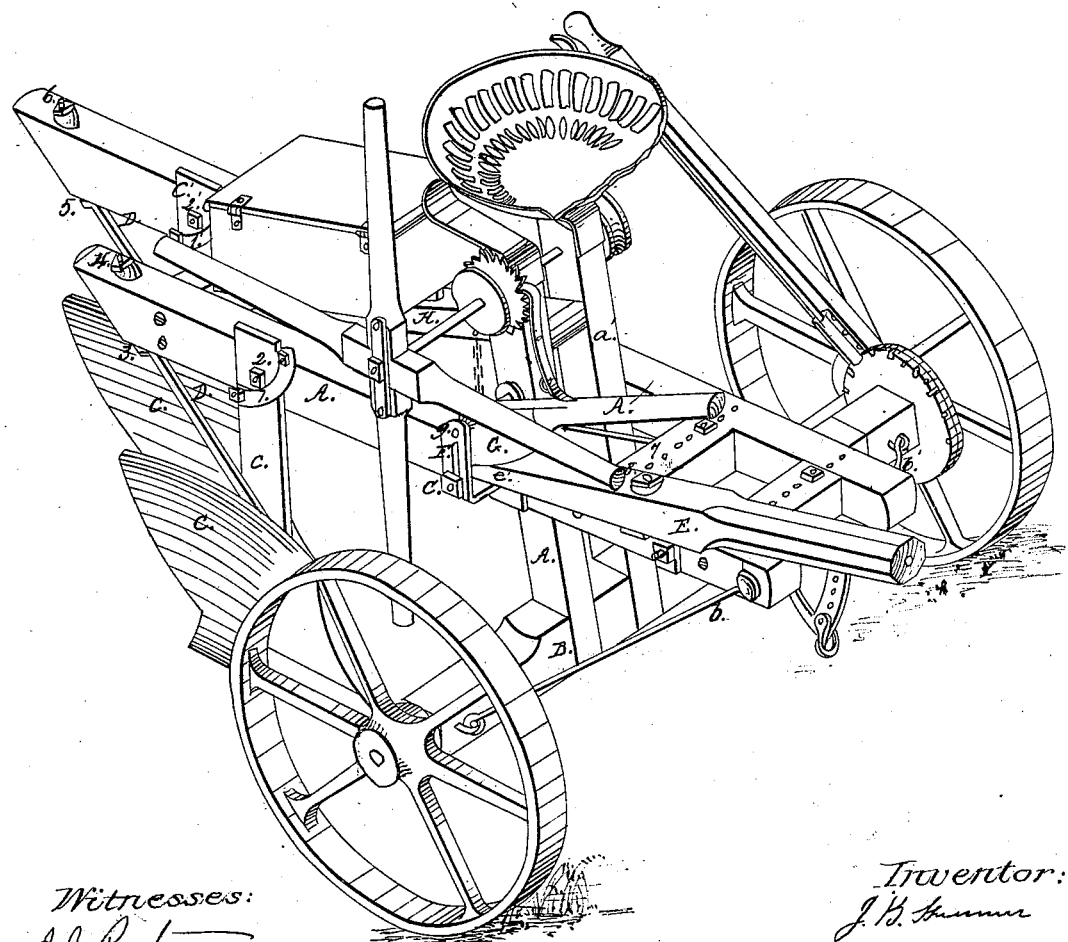

UNITED STATES PATENT OFFICE.

JAMES B. SKINNER, OF ROCKFORD, ILLINOIS.

IMPROVEMENT IN GANG-PLOWS.

Specification forming part of Letters Patent No. 54,029, dated April 17, 1866.

*To all whom it may concern:*

Be it known that I, JAMES B. SKINNER, of the city of Rockford, in the county of Winnebago and State of Illinois, have invented certain new and useful Improvements in Gang-Plows; and I do hereby declare that the following is a full, clear, and exact description of the same, reference being had to the annexed drawing, making a part of this specification, which is a view, in perspective, of my improved gang-plow.

Letters Patent of the United States were granted to me on the 18th day of July, 1865, and numbered 48,846, for certain improvements in gang-plows, and my present improvements have relation to the said patent; and my invention consists in arranging the plows behind the axle, in combination with a rigid frame having vertical adjustability, and in an adjustable brace-rod to govern the relation of the plows to the frame, and in a locking-lever to render the tongue rigid or flexible at the will of the driver.

A rigid frame, A, is supported on standards $a$ and $a'$ on the axle B, resting on two wheels, one of which has a crank-bearing to accommodate the plow to varying surfaces of ground. The frame is composed of two longitudinal pieces, with suitable cross-pieces, to leave it free to move on the outsides of the standards, to which it is connected by chains and a windlass, that serve to move it up and down on the standards, and it is held in place by a ratchet-wheel on the windlass and a pawl on the standard, all as described in my original patent.

The frame A is hinged to the axle B by brace-rods $b$ and $b'$, having one end of the rods attached to the axle by a hook-joint or hinge, and the other end to bolts in the forward end of the main frame; and the rear end of the frame is supported by a hinged brace-bar, H, attached to a bolt in the standards at one end, and by a hinged connection to the rear end of the frame at the other end, so that when the rigid frame is raised or lowered from or toward the axle these braces will all move with it and hold the frame rigidly at the elevation desired.

The plows C and C' are attached to the frame by sliding straps 1 and 1' and screw-bolts 2 and 2', which pass through the plow-standards $c$ and $c'$ and the side timbers of the frame, one of which projects behind the other to receive the second plow.

Brace-rods D and D' are secured at one end to the plow-standards by bolts beneath the upper edge of the mold-boards, while the other ends of these rods pass through the frame and have screw-threads cut upon them to receive each two screw-nuts, 3 and 4, 5 and 6, and as these nuts are moved they vary the relation of the mold-boards to the rigid frame as may be desired to give the plows more or less inclination at their point to plow deeper or shallower, for it is manifest that as the brace-rods are drawn farther through the frame they will elevate the rear of the mold-boards, and, on the contrary, as the brace-rods are forced by the screw-nuts farther down or through the frame the heels of the plows will be depressed and the points of the shares elevated.

To secure the tongue E in a rigid position I pivot it on a bolt, 7, having a nut, 8, to hold it in place upon the frame, and bevel its rear end, $e$, to a thinness that will permit it a vertical vibration in a bracket-frame, F, attached to the main frame. A bolt, 9, in the top of the bracket-frame serves to hold the top of the brackets at a proper distance apart, and also as the fulcrum of a locking-lever, G, that carries or terminates in a handle near the right hand of the driver. It is evident that when this lever is depressed upon the tongue it will hold it rigidly in place; but when the lever is raised it will leave the tongue a free vertical vibration in proportion to the space between the upper surface of the tongue and the bearing-surface of the locking-lever.

By this arrangement of the plows all in rear of the axle I am enabled to use a short frame and a shorter reach than the one described in my original patent. By varying the position of the plows in relation to the frame I can with a simple adjustment vary the depth of plowing, and by the use of the locking-lever I can dispense with the wedge and instantly render the tongue rigid or flexible at pleasure.

What I claim as my invention, and desire to secure by Letters Patent, is—

1. The combination of the plows in a gang-plow with the main frame, constructed, arranged, and operating substantially as described, when all arranged behind the axle and rendered adjustable, substantially as and for the purpose set forth.

2. The combination of the tongue, the main frame, and the locking-lever, substantially as and for the purpose set forth.

In testimony whereof I have hereunto subscribed my name.

JAMES B. SKINNER.

Witnesses:
MARTIN H. SKINNER,
HENRY M. SKINNER.